United States Patent
Yang

(10) Patent No.: US 12,509,025 B2
(45) Date of Patent: Dec. 30, 2025

(54) METHOD OF CONTROLLING A SENSOR CLEANING SYSTEM

(71) Applicants: HYUNDAI MOTOR COMPANY, Seoul (KR); KIA CORPORATION, Seoul (KR)

(72) Inventor: Young Dug Yang, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 200 days.

(21) Appl. No.: 18/221,737

(22) Filed: Jul. 13, 2023

(65) Prior Publication Data

US 2024/0181996 A1   Jun. 6, 2024

(30) Foreign Application Priority Data

Dec. 5, 2022   (KR) .................. 10-2022-0167582

(51) Int. Cl.
*B60S 1/54* (2006.01)

(52) U.S. Cl.
CPC .................. *B60S 1/548* (2013.01)

(58) Field of Classification Search
CPC .... B60S 1/548; B60S 1/56; B60S 1/60; B60S 1/54; B08B 5/02; B60J 9/04; B60W 40/02; B60W 40/105; B60W 60/001; B60W 2420/403; B60W 2420/408; B60W 2556/50; G01C 21/26; G01S 19/42; B60Y 2400/3015; B60Y 2400/3017; B60Y 2400/302; B60Y 2400/303
See application file for complete search history.

(56) References Cited

U.S. PATENT DOCUMENTS

| | | | |
|---|---|---|---|
| 11,273,798 B2 | 3/2022 | Giraud | |
| 2014/0104426 A1* | 4/2014 | Boegel | B60R 11/04 348/148 |
| 2016/0176384 A1* | 6/2016 | Dissette | G01S 7/02 134/34 |
| 2018/0272996 A1* | 9/2018 | Nielsen | B60S 1/52 |
| 2019/0106086 A1 | 4/2019 | Giraud | |
| 2019/0322245 A1* | 10/2019 | Kline | B60S 1/0848 |
| 2020/0159010 A1* | 5/2020 | Kuwae | G02B 27/0006 |
| 2021/0107040 A1* | 4/2021 | Violetta | B08B 3/041 |

FOREIGN PATENT DOCUMENTS

KR   20180136981 A   12/2018
WO   WO-2021130013 A1 *   7/2021   .............. B60S 1/481

* cited by examiner

*Primary Examiner* — Dale W Hilgendorf
*Assistant Examiner* — Frank T Glenn, III
(74) *Attorney, Agent, or Firm* — Lempia Summerfield Katz LLC

(57) ABSTRACT

A sensor cleaning system for an environment sensor mounted on a vehicle is proposed. A method of controlling the sensor cleaning system includes: analyzing driving environment of a vehicle; and instructing the sensor cleaning system to form an air curtain on an environment sensor when the driving environment is determined to be a predetermined setting environment.

18 Claims, 5 Drawing Sheets

METHOD OF CONTROLLING A SENSOR CLEANING SYSTEM

CROSS REFERENCE TO RELATED APPLICATION

The present application claims priority to Korean Patent Application No. 10-2022-0167582, filed Dec. 5, 2022, the entire contents of which are incorporated herein for all purposes by reference.

BACKGROUND

Field

The present disclosure relates to a sensor cleaning system. More particularly, the present disclosure relates to a sensor cleaning system for an environment sensor mounted on a vehicle.

Description of the Related Art

The statements in this section merely provide background information related to the present disclosure and may not constitute prior art.

Recently, a vehicle is equipped with a driver assistance system that assists the driver of the vehicle to ensure safe driving in various driving situations. In addition, research and development on an autonomous vehicle, which can drive the vehicle on its own without a driver's intervention, are being actively conducted.

In the driver assistance system or autonomous vehicle, various types of environment sensors that may sense surrounding environment in various ways are mounted on the vehicle. Examples of the environment sensors mounted on the vehicle may include a radar, a lidar, a camera, etc.

Because these sensors are positioned on the exterior of the vehicle, their sensing areas may be prone to contamination by foreign substances, such as dust, rain, or snow. In order to maintain sensor performance, these sensors should be kept clean above a certain level. To this end, the vehicle is provided with a sensor cleaning system that may clean the sensor when the sensing area is contaminated.

SUMMARY

The present disclosure has been made keeping in mind the above problems occurring in the related art, and an objective of the present disclosure is to provide a method of controlling a sensor cleaning system, which is capable of protecting an environment sensor and keeping it clean.

The objectives of the present disclosure are not limited to the above-mentioned objective, and other objectives which are not mentioned should be clearly understood by those having ordinary skill in the art from the following description.

The present disclosure describes the characteristics that enable the achievement of the above-described objective and the performance of the distinctive function of the present disclosure, which are as follows.

The present disclosure provides a method of controlling a sensor cleaning system. The method includes the following steps, performed by a controller, analyzing driving environment of a vehicle, and instructing the sensor cleaning system to form an air curtain on an environment sensor, when the driving environment is determined to be a predetermined setting environment.

The method of controlling a sensor cleaning system protects an environment sensor and keep it clean.

Effects of the present disclosure are not limited to the above-mentioned effect, and other effects which are not mentioned should be clearly understood by those having ordinary skill in the art from the following description.

BRIEF DESCRIPTION OF THE DRAWINGS

The above and other objectives, features, and other advantages of the present disclosure should be more clearly understood from the following detailed description when taken conjointly with the accompanying drawings, in which.

DETAILED DESCRIPTION OF THE PRESENT DISCLOSURE

Figure 1:
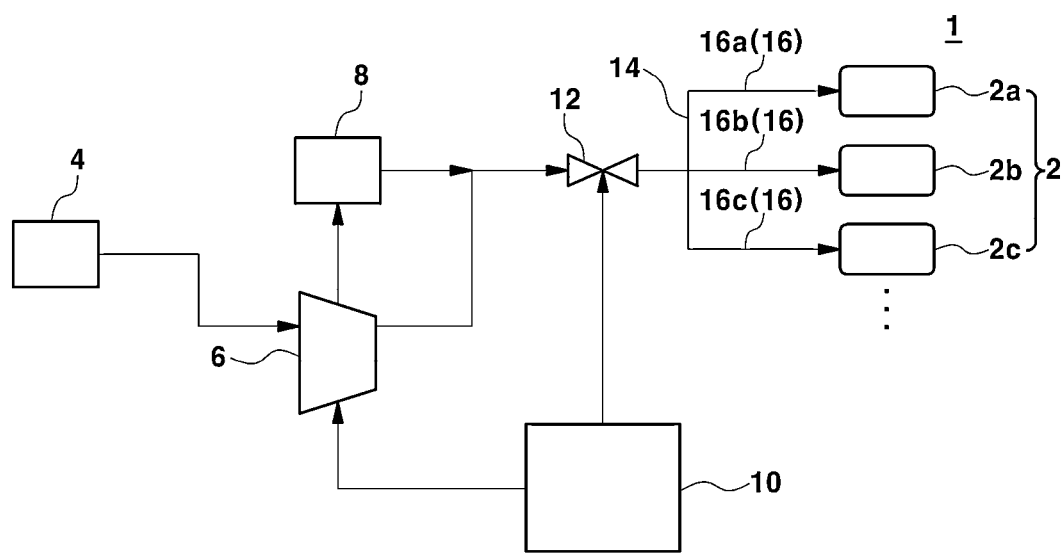
FIG. 1 is a diagram illustrating the configuration of an air cleaning system in one embodiment of the present disclosure.

Specific structural or functional descriptions in the embodiments of the present disclosure are only for description of the embodiments of the present disclosure. The present disclosure may, however, be embodied in many different forms and should not be construed as being limited to only the embodiments set forth herein, but should be construed as covering modifications, equivalents or alternatives falling within ideas and technical scopes of the present disclosure.

In the present disclosure, although the terms "first," "second," etc., may be used herein to describe various elements, these elements should not be limited by these terms. These terms are only used to distinguish one element from another element. For example, without departing from the scope of rights according to the concept of the present disclosure, a first element may be referred to as a second element. Likewise, the second element may also be referred to as the first element.

It should be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between," "adjacent to," or directly adjacent to" should be construed in the same way. When a component, device, element, or the like of the present disclosure is described as having a purpose or performing an operation, function, or the like, the component, device, or element should be considered herein as being "configured to" meet that purpose or to perform that operation or function.

The same reference numerals are used throughout the drawings to designate the same or similar components. The terminology used herein is for the purpose of describing particular embodiments only and is not intended to be limiting. In the present disclosure, the singular forms are intended to include the plural forms as well, unless the context clearly indicates otherwise. It should be further understood that the terms "comprise," "include," "have," etc., when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, the present disclosure is described in detail with reference to the accompanying drawings.

As described above, in order to maintain the performance of an environment sensor that senses the surrounding environment of a vehicle, periodic cleaning of the surface of the sensor is required. For instance, the environment sensor may be contaminated by solid, such as dust or sand, and may get dirty due to liquid, such as raindrops or snow during precipitation.

Particularly, in an active autonomous vehicle, vehicle driving is performed based on surrounding environment information, such as a traffic light, a pedestrian, a road type, a building, or a surrounding vehicles recognized by the environment sensor. If the surface of the environment sensor is contaminated, it becomes impossible to recognize the surrounding environment and active autonomous driving becomes impossible. Therefore, a sensor cleaning system for the vehicle helps the environment sensor to clearly recognize the surrounding environment without distortion and performs an important function to enable driving by removing contaminants from the surface of the sensor.

The environment sensor may be washed using washer fluid or high-pressure air. In the former, the sensor may be washed using the washer fluid and moisture on the sensor may be removed by blowing air. In the latter, foreign substances are removed from the surface of the sensor merely by blowing high-pressure air. Alternatively, cleaning may be performed using high-pressure air and washer fluid in combination.

Figure 2:
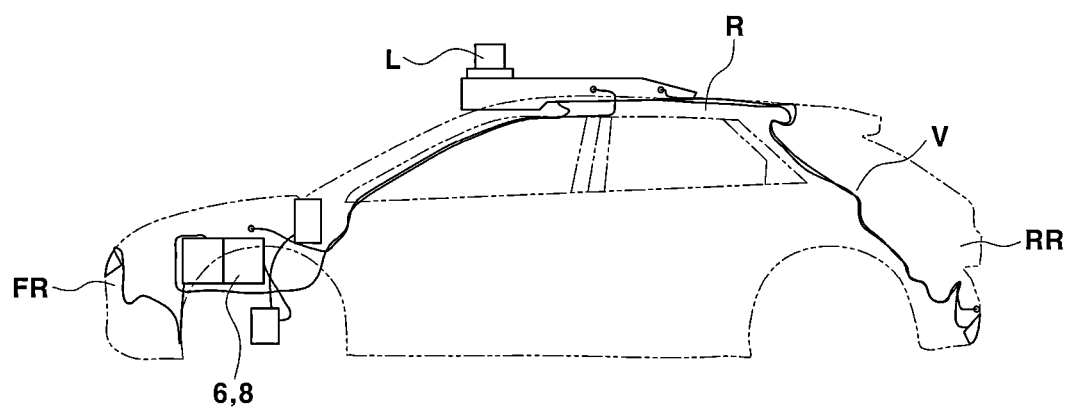
FIG. 2 is a view schematically illustrating a vehicle.

A sensor cleaning system adopting the latter air cleaning method, which washes the environment sensor by spraying compressed air, is described with reference to FIGS. 1 and 2. Among the sensor cleaning systems, the air cleaning system 1 is configured to wash the environment sensor 2 using the compressed air. The air cleaning system 1 performs washing by spraying the compressed air onto the surface of the environment sensors 2a, 2b, 2c (collectively "2"). The environment sensor 2 may include a sensing device such as a lidar L, a radar, or a camera, and may be disposed in a front FR, a rear RR, a side, or a roof R of the vehicle V.

To be more specific, air filtered through an air filter 4 provided in the vehicle "V" is introduced into a compressor 6. By spraying the air compressed by the compressor 6 onto the surface of the environment sensor 2, foreign substances on the environment sensor 2 are removed. Although the environment sensor 2 includes a plurality of environment sensors 2a, 2b, and 2c and three environment sensors are shown in the drawings and specification, the present disclosure is not limited to this number, and the number may be increased or reduced.

Further, the air cleaning system 1 includes an air tank 8. The air tank 8 may be filled with air compressed through the compressor 6 or filled with air by an external device, and the air filled in the air tank 8 may be used to wash the environment sensor 2.

A controller 10 of the air cleaning system 1 is configured to operate a valve 12, e.g., a solenoid valve, at a preset interval or under a preset condition such as when the contamination of the environment sensor 2 is detected. Thus, compressed air is sprayed from the compressor 6 or the air tank 8 to each environment sensor 2, so the environment sensor 2 is washed through the compressed air. A valve 12 may be provided with or integrated with a distributor 14 to distribute compressed air through a nozzle 16 (16a, 16b, 16c) provided in each of the plurality of environment sensors 2.

In spite of the sensor cleaning system such as the air cleaning system 1, cleaning may not be properly performed under certain conditions.

Examples of the certain conditions may include a case in which moisture (liquid) is frozen in the environment sensor 2 due to low temperature or during precipitation, such as snow or rain. In this situation, the sensor cleaning system using high-pressure air or washer fluid should be operated several times, which consumes a lot of energy and may be difficult to remove the moisture immediately.

Even more problematic are insects with high light attraction, phototactic insects, that collide with the environment sensor 2 while the vehicle is driving. When insects fly into impacts and stick to the environment sensor 2 while the vehicle is driving, it is often difficult to remove them even with the sensor cleaning system. In this case, because the environmental sensor 2 has a high contamination level, the sensor cleaning system should be operated several times and energy consumption is high. In some cases, the insects may not even be removed but may stick to the vehicle.

Accordingly, the present disclosure is to provide a method of controlling a sensor cleaning system, which can protect the environment sensor and keep it clean in preparation for the aforementioned situation in which cleaning is difficult.

Figure 3:
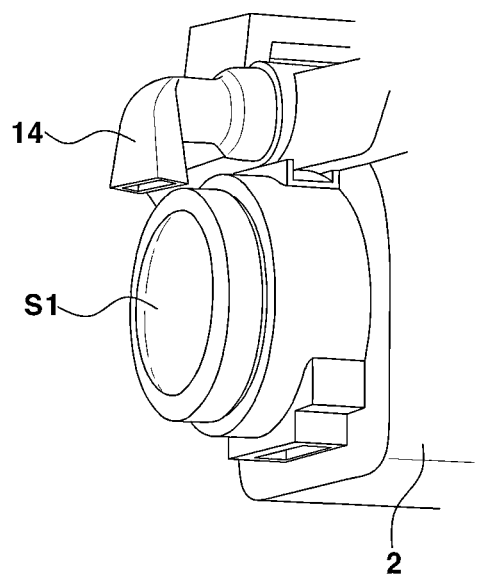
FIG. 3 is a view illustrating a nozzle for a sensor cleaning system according to an embodiment of the present disclosure.

As shown in FIG. 3, according to an embodiment of the present disclosure, the controller 10 is configured to form an air curtain made of high-pressure air on a sensing portion S1 of the environment sensor 2 when a preset condition is met. To be more specific, the controller 10 may form the air curtain by the nozzle 16 through the operation of the valve 12 on the basis of a driving environment where the vehicle V is currently driving.

Figure 4:
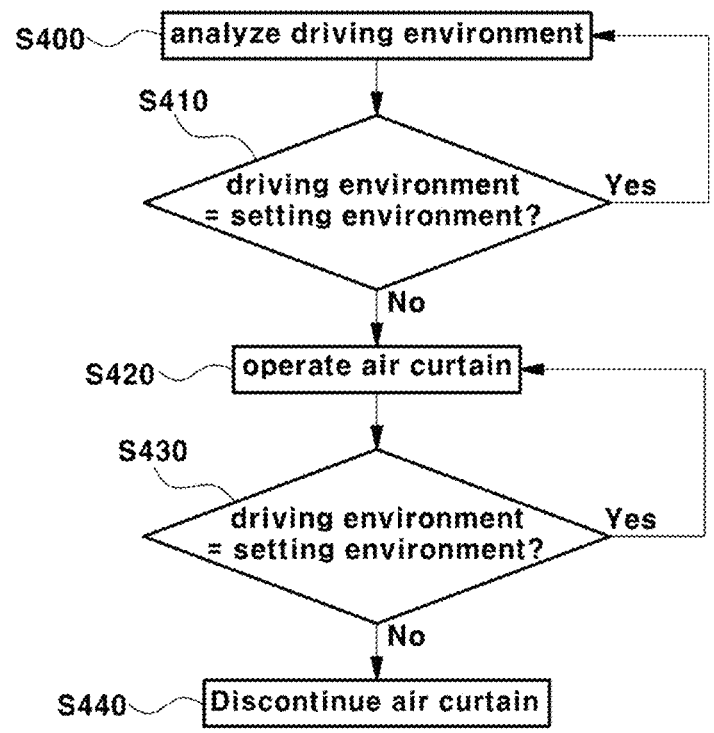
FIG. 4 is a control flowchart of a sensor cleaning system according to an embodiment of the present disclosure.

Referring to FIG. 4, the driving environment of the driving vehicle V is analyzed by the controller 10 (operation S400). At operation S410, the controller 10 may determine whether the driving environment coincides with a setting environment. The driving environment may be determined on the basis of at least one of topographical characteristics, meteorological characteristics, and time characteristics of a place where the vehicle "V" is traveling. In other words, the setting environment may be associated with the topographical characteristics, the meteorological characteristics, and the time characteristics of a place where the vehicle "V" is traveling. Regarding the topographical characteristics, it may be determined that, for example, the appearance of insects is more frequent in areas such as suburbs, countryside, and highlands such as mountains, rather than in urban areas. As another example, regarding the meteorological characteristics, it may be determined that an additional operation is required to protect the environment sensor 2 because there is a possibility of freezing when it is raining and the outside air temperature is low. In addition, as the time characteristics, it may be determined that great damage is caused by insects between sunset and sunrise. In response to determining that the driving environment coincides with the setting environment, the controller 10 may operate the air curtain at operation S420 to protect the environment sensor 2. While operating the air curtain, the controller 10 may determine whether the driving environment still corresponds to the setting environment at operation S430. If the driving environment corresponds to the setting environment, the controller 10 keeps operating the air curtain (operation S420). Otherwise, the controller 10 moves to operation S440 and discontinues the air curtain.

Figure 5:
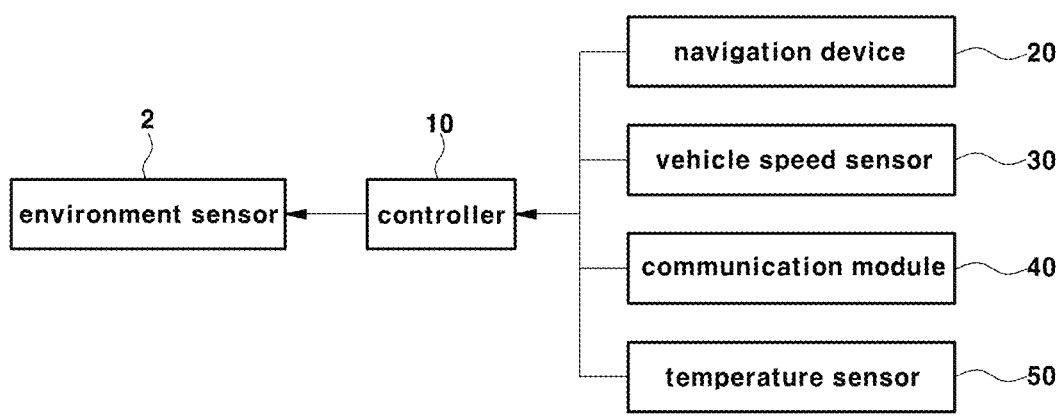
FIG. 5 is a diagram illustrating the communication configuration of a controller of a sensor cleaning system according to some embodiments of the present disclosure.

Referring to FIG. 5, the controller 10 is configured to communicate with various devices inside and outside the vehicle V. In the illustrate example, the controller is configured to communicate with a navigation device 20, a vehicle speed sensor 30, a communication module 40, a temperature sensor 50, and the environment sensor 2. However, the controller 10 may be configured to communicate with other components through a known method as well as the illustrated components.

In some implementations, the navigation device 20 is configured to deliver regional or terrain information of a place where the vehicle V is currently located to the controller 10 using a global positioning system (GPS). The navigation device 20 may be a device that is directly mounted on the vehicle V, or a device that is communicatively connected to the vehicle V although the navigation device is not directly mounted on the vehicle V.

In some implementations, the vehicle speed sensor 30 is configured to deliver current vehicle speed information of the vehicle V to the controller 10. The vehicle speed is taken into consideration because the amount of insect carcasses and the degree to which insects are stuck on the environment sensor may vary depending on the vehicle speed. The vehicle speed sensor 30 may be a sensor built in the vehicle V or may be a separate sensor using the GPS or the like.

In some implementations, the controller 10 is configured to be accessible to an information system such as a web through a communication module 40. The controller 10 may acquire real-time weather information, weather forecast information, sunrise or sunset time, etc., from the information system. Further, the controller 10 may acquire road information about a place where the currently driving vehicle V is located from the information system. The road information may include information, such as the brightness of a streetlight at a corresponding location and the brightness of nearby buildings.

In some implementations, the controller 10 may communicate with the temperature sensor 50. The temperature sensor 50 is configured to measure both the outside air temperature and the inside air temperature of the vehicle V. Likewise, the temperature sensor 50 may also be built in the vehicle V or be a temperature sensor 50 that may be separated but may communicate with the controller 10. The controller 10 may determine the possibility of freezing at least in part on the basis of the measurement information of the temperature sensor 50.

Figure 6:
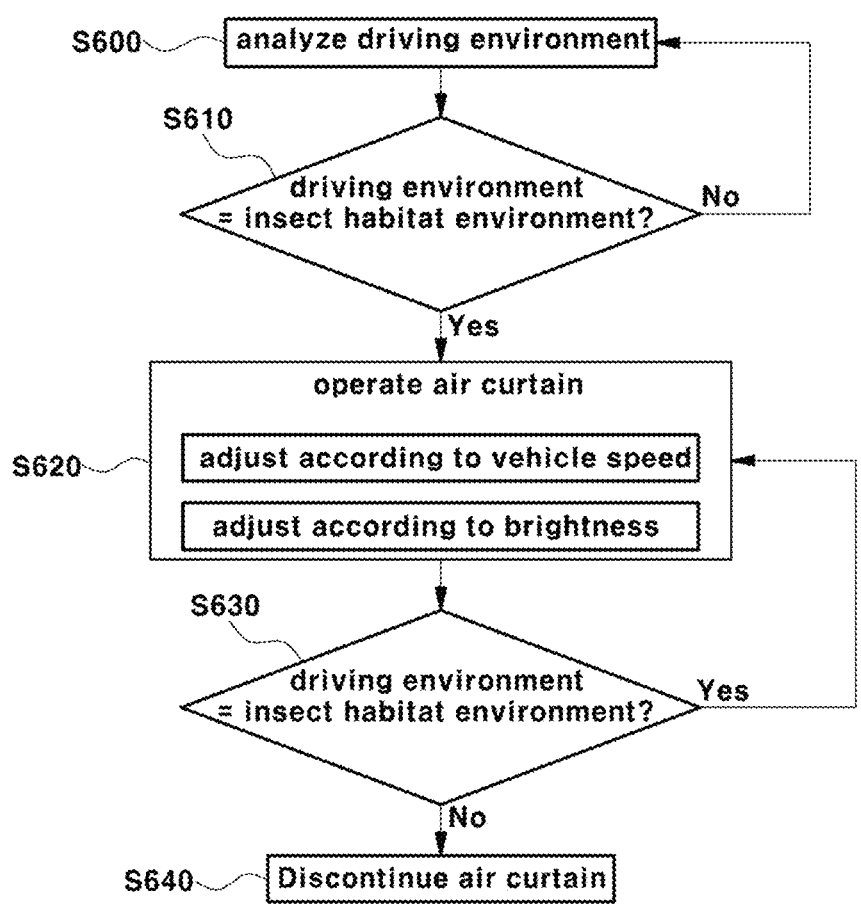
FIG. 6 is a control flowchart of a sensor cleaning system according to some embodiments of the present disclosure.

Referring to FIG. 6, according to an embodiment of the present disclosure, the controller 10 analyzes the driving environment at operation S600. On the basis of the analyzed driving environment, the controller 10 determines whether the driving environment is an insect habitat environment at operation S610. The insect habitat environment may be evaluated by a probability that insects fly near a road on which the vehicle V is currently driving. For instance, in consideration of the time characteristics, the controller 10 determines that the insect habitat environment occurs after sunset and before sunrise. As another example, the controller 10 may determine whether it is the insect habitat environment in consideration of the topographical characteristics.

When it is determined that the driving environment is the insect habitat environment, the controller 10 opens the valve 12 to spray compressed air onto the environment sensor 2 and thereby form the air curtain at operation S620. The formed air curtain may primarily form a barrier against the environment sensor 2 when insects impact the vehicle.

The controller 10 may further adjust the strength, operating method, and the like of the air curtain. In some implementations, the controller 10 may adjust the air curtain according to a vehicle speed. The controller 10 may adjust the flow rate of the air curtain on the basis of vehicle speed information from the vehicle speed sensor 30. As the vehicle speed increases, the collision attachment amount of insects increases. Thus, the controller 10 is configured to increase the flow rate or the number of repetitions of the air curtain when the vehicle speed increases. For example, the flow rate of the supplied compressed air or the flow rate of the air curtain may be controlled by adjusting the opening degree of the valve 12. Further, the number of repetitions of the air curtain may mean the number of repetitions of each cycle, when the formation and halt of the air curtain is taken as one cycle.

In another implementation, the controller 10 is configured to adjust the air curtain according to brightness. The darkness degree of the surrounding environment may be determined based on terrain characteristics, time characteristics, or meteorological characteristics, and the flow rate of the air curtain or the number of repetitions may be adjusted on the basis of the darkness degree. Regarding the phototactic characteristics of insects, the controller 10 may control the flow rate of the air curtain by determining how bright the light source of the vehicle V itself is relative to the surrounding environment in which the vehicle V is driving. As the surrounding darkness, the number of streetlights and the darkness degree according to sunset time may be considered. In an implementation, in the case of nighttime, the flow rate of the air curtain may be set to be higher because there is a high probability of colliding with insects.

At operation S630, the controller 10 continuously or discretely determines whether the current driving environment of the driving vehicle V is the insect habitat environment. When the vehicle V is still in the insect habitat environment, the process returns to operation S620. When it is determined to be out of the insect habitat environment, the controller 10 is configured to stop the air curtain (operation S640).

Figure 7:
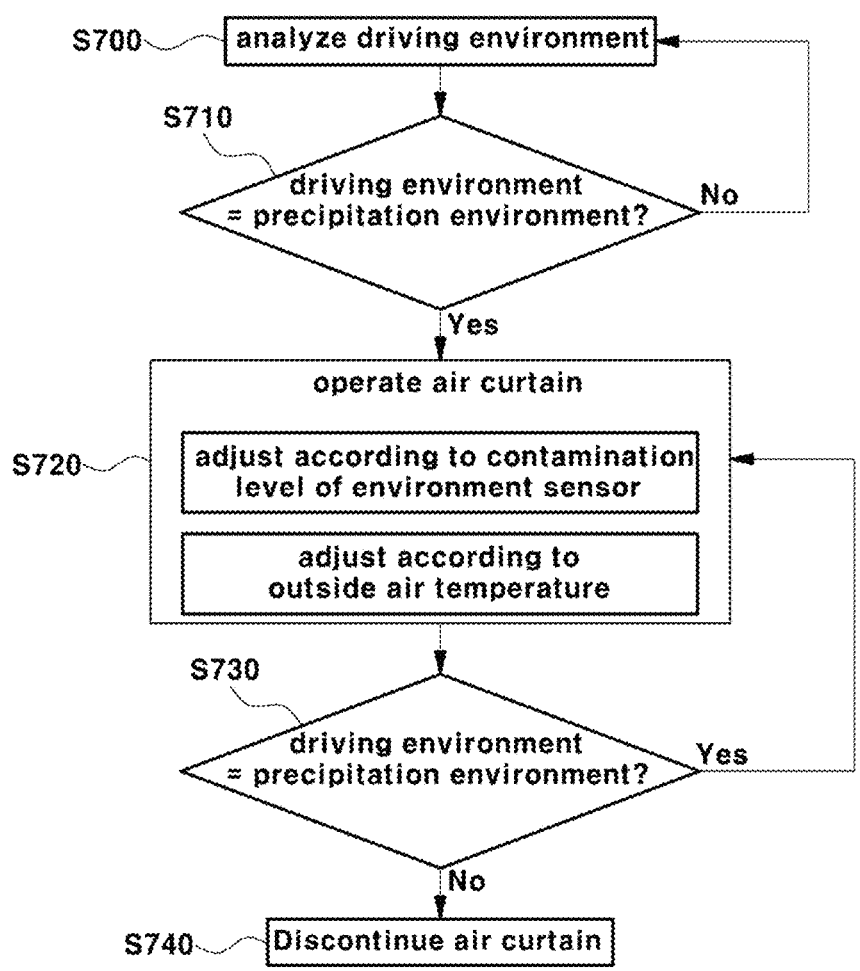
FIG. 7 is a control flowchart of a sensor cleaning system according to some embodiments of the present disclosure.

As shown in FIG. 7, according to an embodiment of the present disclosure, the controller 10 analyzes the driving environment at operation S700. In particular, the controller 10 determines whether the current driving environment is precipitation environment at operation S710. When it is determined that the current driving environment is the precipitation environment such as when it snows or rains, the controller 10 may open the valve 12 so that the air curtain is formed in front of the environment sensor 2 at operation S720.

In some implementations, the controller 10 may adjust the intensity of the air curtain according to the contamination level of the environment sensor 2. Here, the intensity of the air curtain may mean the flow rate of the air curtain or the number of repetitions. For example, when the environment sensor 2 is a camera, the controller may adjust the intensity of the air curtain according to the increasing rate of contaminated pixels through a camera image sensor. If the increasing rate of the contaminated pixels is fast, it can be regarded as a situation in which precipitation is increasing. Thus, the controller 10 is configured to increase the intensity of the air curtain or the number of repetitions.

In another implementation, the controller 10 may adjust the intensity of the air curtain according to the outside air temperature. When the outside air temperature of a place where the vehicle V is driving is equal to or less than a certain temperature, for example, is below zero, the controller 10 may instruct the formation of the air curtain to prevent the environment sensor 2 from being frozen.

Further, the controller 10 continuously or discretely determines whether the driving environment is out of the precipitation environment during the formation of the air curtain (operation S730). When it is determined that the vehicle V is still in the precipitation environment, the controller 10 returns the process to operation S720. In contrast, when it is determined that the vehicle V is out of the precipitation environment, the controller 10 may instruct the air cleaning system 1 to cease the air curtain at operation S740.

As described above, if insect carcasses adhere to the surface of the environmental sensor, it is often difficult or impossible to clean with any system such as air cleaning or washer fluid cleaning. Therefore, according to the present disclosure, it is possible to prevent insects from colliding with the environment sensor 2 by preemptively forming the barrier using the air curtain in front of the environment sensor in an area where insects are highly likely to appear by analyzing the driving environment of the vehicle.

In addition, even when there is a possibility of precipitation or freezing, the air curtain may be formed in advance to prevent degradation of the sensing ability of the environmental sensor that may occur due to raindrops, snow, ice, or the like.

Although the present disclosure was described with reference to specific embodiments shown in the drawings, it is apparent to those having ordinary skill in the art that the present disclosure may be changed and modified in various ways without departing from the scope of the present disclosure.

What is claimed is:

1. A method of controlling a sensor cleaning system, the method comprising:
    determining, by a controller, a driving environment of a vehicle;
    instructing, by the controller, the sensor cleaning system to form an air curtain on an environment sensor based on determining that the driving environment is a predetermined setting environment including an insect habitat environment;
    collecting, by the controller, a current location of the vehicle from a navigation device of the vehicle;
    determining, by the controller, whether the driving environment is the insect habitat environment based on determining that the current location is a suburban area, a countryside area, or a highland area;
    intaking air and generating compressed air, by a compressor of the sensor cleaning system; and
    based on the driving environment being the insect habitat environment, spraying, by a nozzle arranged around the environment sensor, the compressed air onto the environment sensor.

2. The method of claim 1, further comprising:
    determining, by the controller, whether the driving environment is the predetermined setting environment during formation of the air curtain; and
    instructing, by the controller, the sensor cleaning system to stop the formation of the air curtain based on determining that the driving environment is out of the predetermined setting environment.

3. The method of claim 1, further comprising:
    determining, by the controller, whether the driving environment is the predetermined setting environment during formation of the air curtain; and
    instructing, by the controller, the sensor cleaning system to maintain the formation of the air curtain based on determining that the driving environment is the predetermined setting environment.

4. The method of claim 1, wherein determining whether the driving environment is the predetermined setting environment is determined based on one or more of topographical characteristics, time characteristics, or meteorological characteristics of a place where the vehicle is located.

5. The method of claim 1, wherein instructing the sensor cleaning system comprises:
    instructing the sensor cleaning system to change an intensity or frequency of the air curtain according to a vehicle speed.

6. The method of claim 1, wherein instructing the sensor cleaning system comprises:
    instructing the sensor cleaning system to change an intensity or frequency of the air curtain according to a brightness of the driving environment of the vehicle.

7. The method of claim 1, further comprising:
    determining, by the controller, a contamination level of the environment sensor; and
    instructing, by the controller, the sensor cleaning system to change an intensity or frequency of the air curtain according to the contamination level of the environment sensor.

8. The method of claim 1, further comprising:
    collecting, by the controller, an outside air temperature of the driving environment of the vehicle; and
    instructing, by the controller, the sensor cleaning system to change an intensity or frequency of the air curtain according to the outside air temperature.

9. The method of claim 1, wherein instructing the sensor cleaning system to form the air curtain further comprises:
    adjusting an intensity or frequency of the air curtain according to the driving environment.

10. The method of claim 1, wherein the predetermined setting environment further includes a precipitation environment.

11. The method of claim 10, wherein an intensity or frequency of the air curtain is adjusted according to a contamination level of the environment sensor.

12. The method of claim 10, wherein an intensity or frequency of the air curtain is adjusted according to an outside air temperature of the driving environment of the vehicle.

13. The method of claim 1, wherein an intensity or frequency of the air curtain is adjusted according to a vehicle speed.

14. The method of claim 1, wherein an intensity or frequency of the air curtain is adjusted according to a brightness of the driving environment of the vehicle.

15. The method of claim 1, wherein the environment sensor comprises one or more of a lidar, a radar, or a camera mounted on the vehicle.

16. The method of claim 1, wherein the controller is configured to communicate with one or more of a navigation device based on a global positioning system (GPS), a vehicle speed sensor configured to measure vehicle speed, a communication module configured to communicate with a web-based information system, or a temperature sensor configured to sense outside air of the driving environment of the vehicle.

17. The method of claim 1, further comprising:
increasing an intensity of the compressed air sprayed as a speed of the vehicle increases.

18. A method of controlling a sensor cleaning system, the method comprising:
collecting, by a controller, a sunset time and a sunrise time from a web-based information system;
based on determining that a current time is between the sunset time and the sunrise time, determining that a driving environment is an insect habitat environment;
based on the driving environment being the insect habitat environment, intaking air and generating compressed air, by a compressor of the sensor cleaning system; and
spraying, by a nozzle arranged around an environment sensor, the compressed air onto the environment sensor.

* * * * *